United States Patent Office 2,928,797
Patented Mar. 15, 1960

2,928,797
AQUEOUS DISPERSION OF SYNTHETIC POLYMERS FOR FLOOR POLISHING COMPOSITION

Marion O. Brunson and William M. Gearhart, Kingsport, Tenn., assignors to Eastman Kodak Company, Rochester, N.Y., a corporation of New Jersey No Drawing. Application September 12, 1957
Serial No. 683,460

3 Claims. (Cl. 260—23)

This invention concerns the preparation of an aqueous dispersion of synthetic polymers for use as a floor polishing composition, more particularly to a high resin content water emulsion floor polish.

Various wax compositions have been proposed for polishing asphalt, vinyl and rubber tile, many of these being aqueous dispersions of waxy materials. It has been generally accepted that such floor polishing compositions should contain at least some natural wax such as carnauba, ouricury or candelilla, although the natural wax content of the high-resin type polish is usually very low. These natural waxes are not native to the United States and, therefore, they must be imported. Due to uncertain political circumstances, drought and other factors affecting the harvesting of these materials, there are usually wide fluctuations in price and availability; moreover, they are sometimes uncertain in quality. Accordingly, it has been highly desirable to develop polish formulations based purely on synthetic materials which are subject to close control and which are readily available in this country.

In addition to the uncertainties of availability and quality inherent in natural waxes, it is well known that certain wax compositions have deleterious qualities and are subject to water spotting, poor anti-slip properties, low resistance to scuff and dirt pickup and poor gloss. In most cases the addition of an anti-slip agent such as colloidal silica was necessary. Consequently it has been desired to obtain a wax composition having either a complete content of synthetic resins or at least a major proportion of synthetic resins, which would provide the qualities reproducible under all circumstances.

We have discovered a high-resin content water emulsion that not only exhibits high gloss and resistance to scuff and dirt pickup, but also has good anti-slip properties and resistance to water spotting. This wax is an aqueous dispersion of polyethylene wax, polystyrene, polyacrylate and bleached, dewaxed shellac.

One object of this invention is to provide a high-resin content water emulsion. Another object of this invention is to provide a wax composition which exhibits high gloss and resistance to scuff and dirt pickup, anti-slip properties and resistance to water spotting. A further object is to provide a wax composition which is subject to close control and which contains ingredients, all of which are available in this country. A further object is to provide a high-resin content water emulsion wax which can be used to polish asphalt, vinyl and rubber tile. An additional object is to provide a floor polishing composition which does not require natural wax such as carnauba, ouricury or candelilla.

The above objects are obtained by combining four components. The following is our preferred composition:

| | Parts |
|---|---|
| Polyethylene dispersion at 16% solids | 375 |
| Bleached, bone-dry, dewaxed shellac @ 12% solids | 125 |
| Polymethylmethacrylate dispersion at 38% solids | 125 |
| Polystyrene dispersion at 40% solids | 375 |
| Total | 1000 |

These parts are by weight. Solids content of the finished polish compositions is 28 percent.

This composition may be diluted with water to the desired solids concentration. For the best results, dilution may be from 12 to 16 percent solids. The respective materials which are combined to provide the finished polish composition are prepared as follows:

Polyethylene dispersion

A low molecular weight polyethylene wax prepared according to the process disclosed in co-pending application Serial No. 486,974, filed February 8, 1955, having a molecular weight of 2500 and an acid number of 8–12 was used. In order to obtain this wax, a low molecular weight (2000–4000) polyethylene was obtained by thermally degrading polyethylene having a molecular weight of from 10,000–30,000. This thermally degraded polyethylene was then oxidized to produce an emulsifiable polyethylene wax.

| | Parts by weight |
|---|---|
| Polyethylene wax | 49.5 |
| Oleic acid | 9.4 |
| Morpholine | 6.4 |
| Water | 309.6 |
| Total | 375.0 |

This dispersion is prepared by melting the polyethylene wax and oleic acid, cooling to 110–115° C. and adding the morpholine. This mixture is stirred for 1–2 minutes and then rapidly poured into hot (90° C.) water with good agitation. Some variations are possible of 8.7–9.9 parts oleic acid, 6.1–7.4 parts morpholine and 120–350 parts water.

SHELLAC

The resinous incrustation produced by the insect "Laccifer lacca Kerr" is known as stick-lac. This material is scraped from the twigs of various trees in India, Siam and Indochina and ground into a powder. The powder is then sieved and later washed with dilute sodium carbonate. The washing process removes most of the red dye, the soluble products and the woody material. After being dried, this material is sold as seed-lac.

In order to get the refined bleached dewaxed shellac, the seed-lac is first dissolved in a sodium carbonate solution. The impurities are allowed to settle and then the wax is removed by filtration. After filtering, the solution is bleached with sodium hypochlorite until it reaches a standard color. The bleached shellac is then recovered by precipitating the solution with sulfuric acid, agglomerating by heating the suspension, draining, grinding and drying. This material is then used in our formulation by dissolving in aqueous ammonia in the following manner to form a 12% solution:

| | |
|---|---|
| Shellac | 120 |
| 28% ammonium hydroxide | 30.5±2.0% |
| Water | 849.5±2.0% |
| Total | 1000.0 |

The water is heated to 170–180° F. and one-half of the ammonia added. Shellac which has been previously ground to a fine particle size is added followed by the remaining ammonia. The temperature is then raised to about 200° F. and held until a clear solution is obtained. This solution is then cooled, filtered, and stored for use in the wax emulsion.

Various synthetic materials have been formulated to duplicate the natural-resin shellac, and although we use a 12 percent shellac solution, a 12 percent solution of one of these resinous substitutes may also be used and are understood to be equivalents when used in our invention to bleached dewaxed shellac. Typical of this type of synthetic resin are the rosin-modified polyester types which are rosin materials which have been modified using maleic anhydride and which are soluble in ammonia and other amines. These may be prepared by cooking natural rosins with maleic anhydride and a glycol. A mixed polyester results.

The following commercially available resins have been found to be suitable as satisfactory maleic-modified rosins and can be substituted for shellac in our invention.

| Resin | Acid No. | Softening Point | Manufacturer |
| --- | --- | --- | --- |
| Durez 15546 | 130 ±7 | 311±9° F | Durez Plastics Division. |
| Durez 17211 | 149±5 | 217°±12° F | Do. |
| Amberol 750 | 102-114 | 275°-311° F | Rohm & Haas Company. |
| Shelite 3551 | 95-110 | 300° approx | T. F. Washburn. |
| Dollac 14 | 90-95 | 280-300° F | Cato Chemical Company. |
| Catolac 21 | 111-115 | 270-290° F | Do. |
| Shanco L-1001 | 122 | 275° F. approx | Shanco Plastics & Chemical Company. |

In order to be operative, the maleic-modified rosin should have an acid number range of 90 to 155 and a softening point range of 200 to 311° F.

POLYMETHYLMETHACRYLATE

A polymethylmethacrylate dispersion is prepared from a finely divided polymethylmethacrylate. The particular method of preparing such a polymeric material is not critical to our invention. However, a typical preparation may be carried out by emulsion polymerization using a peroxide catalyst. Choice of catalyst, emulsifier or the like is within the skill of the art.

MODIFIED POLYSTYRENE

A modified polystyrene is used which can be very finely divided. Such a polystyrene is prepared in a flask having three necks and equipped with a reflux condenser, stainless steel agitator, thermometer and nitrogen inlet tube. The flask is charged with 264 grams of styrene (washed with dilute sodium hydroxide solution), 88 grams of divinyl benzene (washed with dilute sodium hydroxide) and 132 grams of acrylonitrile. A stream of nitrogen is started through the mixture and continued during the entire reaction. To the mixture is added 40 grams of a wetting agent such as a higher aliphatic sulfate which may be the sulfate of lauryl alcohol in 1200 ml. of water, 2 grams of potassium chloride and 0.26 gram tertiary-dodecylmercaptan. An activator solution was prepared as follows:

20 ml. of water were adjusted to a pH 3 to 4 with dilute sulfuric acid and 0.76 gram of ferrous sulfate and 0.84 gram of potassium pyrophosphate were added and the mixture was warmed to 60° C.

This activator solution was added to the reaction mixture and 4.8 grams of di-isopropyl-benzene hydroperoxide (51.8 percent assay) were added. After a 10-minute induction period an exothermic reaction took place and external water cooling was applied. The mixture was stirred and held at a temperature of 50-55° C. for 20 hours. The mixture was decanted from 10 grams of solid precipitate and 1743 grams of opaque liquid emulsion was obtained.

The polystyrene which is used in our invention has a molecular weight of over 150,000 and a particle size of less than 0.01 micron. A suitable commercially available polystyrene dispersion having the properties which enable it to be used in our invention is sold under the trade name U-2003 Ubatol by the UBS Chemical Corporation, Cambridge, Massachusetts.

The final polish composition may be as follows, based on the solids concentration. Percentages are by weight.

| | Composition by wt. Solids, Percent | Variation, Percent |
| --- | --- | --- |
| Polyethylene dispersion | 17.50 | 16-19 |
| Shellac | 5.30 | 4.6 |
| Polymethylmethacrylate | 16.79 | 14-17 |
| Modified Polystyrene | 50.27 | 45-55 |
| Oleic Acid and Plasticizers | 10.14 | 8-12 |

The variation in oleic acid and plasticizers will depend on variations in polyethylene and polystyrene and should be proportional.

Example 1

The composition described above as our preferred embodiment was prepared and diluted to 16 percent solids concentration. After the polyethylene wax was compounded as described above, the mixture was poured into hot water with good agitation and the 12 percent shellac solution added to this dispersion while still hot, the preferred temperature being 195° F. The water dispersion of shellac and polyethylene wax was then allowed to cool and the polymethylmethacrylate dispersed in water added. Finally the modified polystyrene resin dispersion was added. After preparing the wax composition, it was diluted to 16 percent solids concentration. This polish composition was then applied to an asphalt tile test area with a soft wool flannel cloth and compared with commercial polishing formulations.

The following gloss readings were observed with a Gardner 60° gloss meter on yellow asphalt tile. This was a one-coat application with no buffing.

| Composition | Gloss Reading |
| --- | --- |
| Composition described as our preferred embodiment | 70 |
| Commercial Polish A | 30 |
| Commercial Polish B | 23 |
| Commercial Polish C | 22 |
| Commercial Polish D | 21 |
| Blank Tile | 7 |

Since no absolute values can be given to scuff resistance, water resistance, anti-slip, leveling, and resistance to dirt pickup, it can only be said that the polish composition of this invention gave equal or superior properties in every case.

The term "oxidized thermally degraded polyethylene" as used hereinafter is intended to describe polyethylene wax produced by the process of heating polyethylene having a molecular weight of 10,000-30,000 in the absence of air to obtain a product having a molecular weight of 1,000-6,000 melting the polyethylene so obtained, then oxidizing with an oxygen-containing gas to produce a composition having an acid number of from 4 to 25. The process for producing this oxidized thermally degraded polyethylene is described in co-pending U.S. patent application Serial No. 486,974, filed February 8, 1955.

What we claim and desire to secure by Letters Patent of the United States is:

1. A wax composition comprising (A) 16-19% oxidized thermally degraded polyethylene having an acid number of 8-12 obtained by oxidizing polyethylene which has been thermally degraded to a molecular weight of 2000-4000 from a molecular weight of 10,000-30,000, (B) 4-6% of a resinous material selected from the class consisting of bleached, dewaxed shellac and maleic modified rosin which are soluble in ammonia, (C) 14-17% polymethacrylate obtained by emulsion polymerization, (D) 45-55% of a polymer of styrene, divinyl benzene and acrylonitrile having a molecular weight of over 150,000 and a particle size of less than 0.01 micron obtained by emulsion polymerization, and (E) 8-12% of a mixture of oleic acid and a plasticizer.

2. A wax composition comprising (A) 16–19% oxidized thermally degraded polyethylene having an acid number of 8–12 obtained by oxidizing polyethylene which has been thermally degraded to a molecular weight of 2000–4000 from a molecular weight of 10,000–30,000, (B) 4–6% bleached dewaxed shellac, (C) 14–17% polymethacrylate obtained by emulsion polymerization, (D) 45–55% of a polymer of styrene, divinyl benzene and acrylonitrile having a molecular weight of over 150,000 and a particle size of less than 0.01 micron obtained by emulsion polymerization, and (E) 8–12% of a mixture of oleic acid and a plasticizer.

3. A wax composition comprising (A) 16–19% oxidized thermally degraded polyethylene having an acid number of 8–12 obtained by oxidizing polyethylene which has been thermally degraded to a molecular weight of 2000–4000 from a molecular weight of 10,000–30,000, (B) 4–6% of a maleic modified rosin which is soluble in ammonia, (C) 14–17% polymethacrylate obtained by emulsion polymerization, (D) 45–55% of a polymer of styrene, divinyl benzene and acrylonitrile having a molecular weight of over 150,000 and a particle size of less than 0.01 micron obtained by emulsion polymerization, and (E) 8–12% of a mixture of oleic acid and a plasticizer.

References Cited in the file of this patent

UNITED STATES PATENTS

| | | |
|---|---|---|
| 2,341,175 | Britton et al. | Feb. 8, 1944 |
| 2,695,377 | Pabst et al. | Nov. 23, 1954 |
| 2,733,224 | Smith et al. | Jan. 31, 1956 |
| 2,766,214 | Erchak et al. | Oct. 9, 1956 |
| 2,839,482 | Geen et al. | June 17, 1958 |

FOREIGN PATENTS

| | | |
|---|---|---|
| 476,476 | Canada | Aug. 28, 1951 |

OTHER REFERENCES

Perry et al.: Soap & Chem. Spec., pages 145–147, 167, vol. 30, September 1954.

Warth: The Chemistry & Technology of Waxes, pages 533–534, 708–724, Rheinhold, 1956.